United States Patent [19]
Katase et al.

[11] Patent Number: 5,704,112
[45] Date of Patent: Jan. 6, 1998

[54] METHOD OF MANUFACTURING A MAGNETIC HEAD

[75] Inventors: Shunichi Katase; Sigeo Tamura, both of Tokyo, Japan

[73] Assignee: TDK Corporation, Tokyo, Japan

[21] Appl. No.: 660,596

[22] Filed: Jun. 11, 1996

Related U.S. Application Data

[62] Division of Ser. No. 366,448, Dec. 30, 1994, which is a continuation of Ser. No. 952,920, Sep. 28, 1992, abandoned.

[30] Foreign Application Priority Data

May 29, 1992 [JP] Japan ................................. 4-164392

[51] Int. Cl.⁶ ............................................................ G11B 5/42
[52] U.S. Cl. ............................ 29/603.12; 360/102; 360/122
[58] Field of Search ............... 29/603.12; 360/102–104, 360/122

[56] References Cited

U.S. PATENT DOCUMENTS

| | | |
|---|---|---|
| 4,285,019 | 8/1981 | Scott et al. . |
| 4,670,806 | 6/1987 | Ghose . |
| 5,065,500 | 11/1991 | Yoneda et al. .................. 29/603.12 |
| 5,442,850 | 8/1995 | Kerth .............................. 29/603.12 |

FOREIGN PATENT DOCUMENTS

| | | |
|---|---|---|
| 0 110 212 | 6/1984 | European Pat. Off. . |
| 58-21329 | 4/1983 | Japan . |
| 58-28650 | 6/1983 | Japan . |
| 1-267816 | 10/1989 | Japan . |
| 3-49018 | 3/1991 | Japan . |
| 2 225 143 | 5/1990 | United Kingdom . |

OTHER PUBLICATIONS

JP-A-59-132416 Jul. 1984.
JP-A-62-6475 Jan. 1987.
JP-A-1-176376 Jul. 1989.
JP-A-1-199762 Aug. 1989.
JP-A-1-251308 Oct. 1989.
JP-A-1-267822 Oct. 1989.
JP-A-4-305877 Oct. 1992.
JP-A-5-20826 Jan. 1993.
IBM Technical Disclosure Bulletin, vol. 34, No. 4B, Sep. 1991, pp. 158–160, "Sliders With Well–Defined Undulation Patterns on the ABS for Improved Stiction and Flyability".
Patent Abstracts of Japan, vol. 13, No. 454, (P–944), Oct. 13, 1989, & JP-A-1 176 376, Jul. 12, 1989, Itou Yoshiaki, et al., "Magnetic Head".

*Primary Examiner*—Carl E. Hall
*Attorney, Agent, or Firm*—Oblon, Spivak, McClelland, Maier & Neustadt, P.C.

[57] ABSTRACT

A slider for a magnetic head has air bearing surfaces in a medium opposing surface, and traces of processing are formed in the medium opposing surface excluding the air bearing surfaces to induce a strain in the medium opposing surface whereby the planer structure of the air bearing surfaces is controlled.

4 Claims, 6 Drawing Sheets

METHOD OF MANUFACTURING A MAGNETIC HEAD

This is a Division, of application Ser. No. 08/366,448 filed on Dec. 30, 1994, pending, which is a Continuation of application Ser. No. 07/952,920, filed Sep. 28, 1992, abandoned.

The present invention relates to a magnetic head comprising a slider and a magnetically transducing element and a method of manufacturing such magnetic head. More particularly, it relates to an improvement in controlling a planar structure for an air bearing surface formed in the slider of a magnetic head.

For a magnetic disk device, there has been used a magnetic head operable keeping an air gap between a magnetically recording/reproducing medium and the magnetic head by utilizing a dynamic pressure produced by the movement of the medium. Such magnetic head is disclosed in, for instance, Japanese Examined Patent Publication No. 28650/1983. As a basic construction, a magnetically transducing element is disposed at the air-discharge end side of the slider which has an air bearing surface at the side facing a magnetic recording/reproducing medium.

The medium opposing surface of a magnetic head of this kind is subjected to a grinding operation so that the medium opposing surface has a high degree of flatness. Further, it is sometime necessary to control the planar structure of the air bearing surface to have a convex surface or a concave surface at a small local area in order to improve the starting characteristics and the operating characteristics. For instance, in a small-sized magnetic disk device, there is a requirement that a slider has a crown structure of a slightly convexed surface so as not to substantially influence the flying characteristics in order to avoid an increase of torque of the motor due to a friction by the mutual contact between the magnetic head and the magnetic recording medium when the magnetic disk device is started.

With respect to a technique of controlling the planar structure of the air bearing surface of slider, Japanese Examined Patent Publication No. 21329/1983 discloses mechanically grinding the medium opposing surface of a slider. Further, Japanese Unexamined Patent Publication No. 176376/1989 discloses a technique that a hardening resin is applied to the surface opposite the medium opposing surface of a slider whereby the planar structure of the air bearing surface is controlled by utilizing the cure shrinkage function of the hardening resin. Further, in Japanese Unexamined Patent Publication No. 267822/1989, there is disclosed a technique that a groove having a relatively large width is formed in the surface opposite the medium opposing surface to thereby control the degree of flatness of the air bearing surface by utilizing a difference of strain by machining between the grooved portion and the other portion without the groove.

However, an extremely small area is used to control the degree of flatness of the air bearing surface. For instance, a convex surface required to form a crown shape has a minute convexed area in a range from about 10 nm to about 300 nm. It is very difficult to form such minute convexd area by a continuous mechanical-grinding method disclosed in Japanese Examined Patent Publication No. 21329/1983. Further, such mechanical-grinding operation has become difficult because there is a tendency of sliders being miniaturized due to a demand of low flight height in order to perform a high density recording.

In a case of controlling flatness of an air bearing surface by controlling an amount of a curable resin to be attached to the slider, there is a disadvantage that the flatness of the air bearing surface is changed due to aging of the curable resin. A method of controlling the flatness of the air bearing surface by machining a groove has such a disadvantage that it is difficult to perform the machining of a groove and a tool for exclusive use which can provide a high flatness is required. Accordingly, processability was poor as a whole, and manufacturing cost was high.

It is an object of the present invention to provide a magnetic head for simple and reliable control, providing good processability and a low manufacturing cost without a change by aging in the planar structure of the air bearing surface, and a method of manufacturing the magnetic head.

In accordance with the present invention, there is provided a magnetic head with a slider, characterized in that the slider has an air bearing surface in a medium opposing surface, and at least one between the medium opposing surface excluding the air bearing surface and the surface opposite the medium opposing surface of the slider has a trace of processing which is arranged on a linear line imaginarily drawn on the surface.

In accordance with the present invention, there is provided a method of manufacturing a slider with an air bearing surface in a medium opposing surface for a magnetic head, characterized by forming a trace of processing in at least one between the medium opposing surface excluding the air bearing surface of the slider and the surface opposite the medium opposing surface of the slider, whereby the planar structure of the air bearing surface is controlled by a strain induced by the trace of processing.

Figure 1:
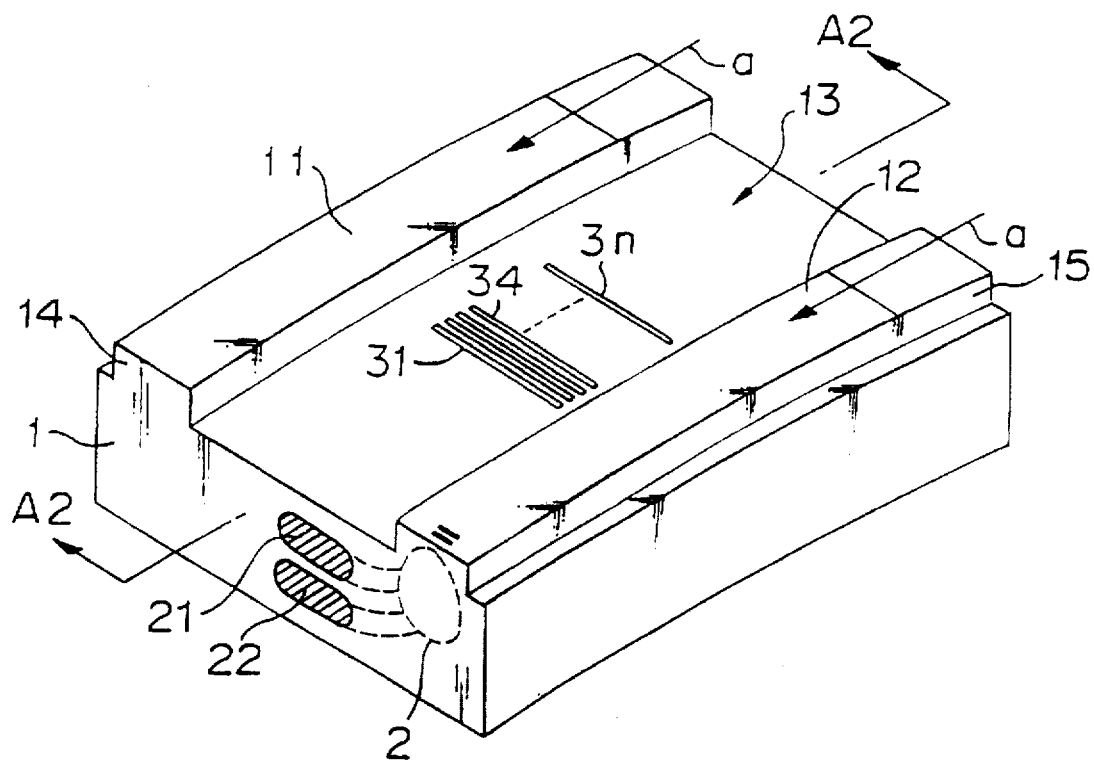
FIG. 1 is a perspective view of an embodiment of the magnetic head according to the present invention.
Figure 2:
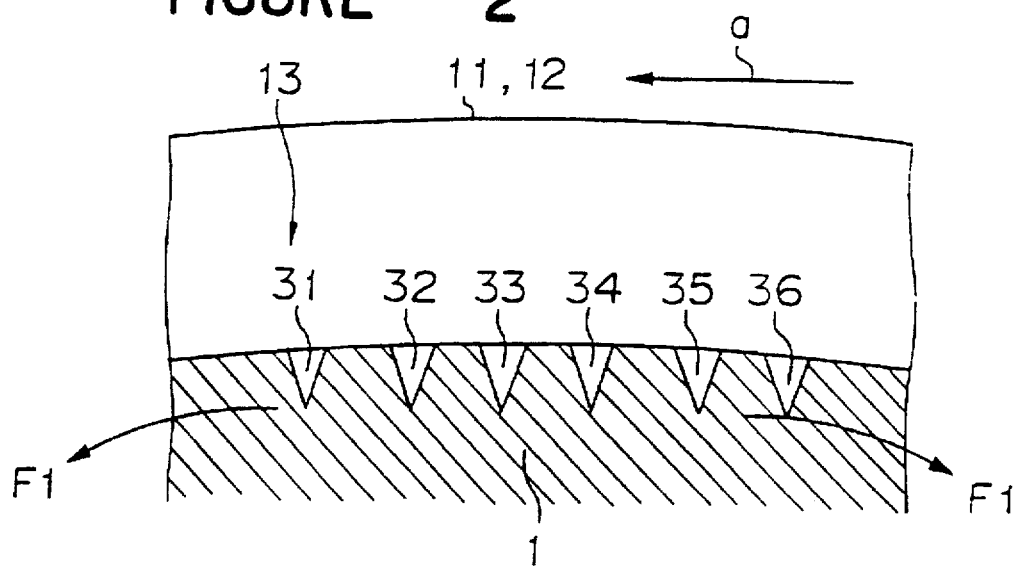
FIG. 2 is an enlarged cross-sectional view partly broken taken along a line A2—A2 in FIG. 1.

Preferred embodiment of the magnetic head of the present invention will be described with reference to the drawings. In FIGS. 1 and 2, reference numeral 1 designates a slider and numeral 2 designates a magnetically transducing element. The slider 1 comprises air bearing surfaces 11, 12 in the medium opposing surface and a groove 13 recessed from the air bearing surfaces 11, 12. The air bearing surfaces 11, 12 is formed along the longitudinal direction of the slider 1. The longitudinal direction of the slider 1 coincides with an air flowing direction a when the slider 1 is placed above a magnetic recording medium such as a magnetic disk.

Figure 3:
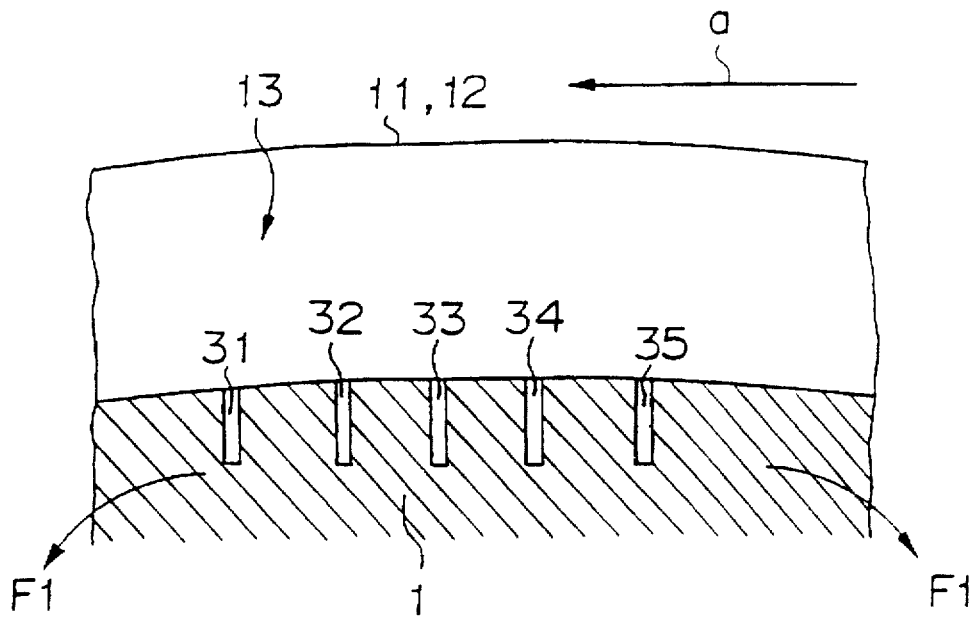
FIG. 3 is an enlarged cross-sectional view partly broken of another embodiment of the magnetic head according to the present invention.

The groove 13 is provided with traces of processing 3*l*–3*n* having a small depth which induce a strain in the bottom surface of the slider 1. The traces of processing 3*l*–3*n* are formed in a direction traversing the longitudinal direction of the slider 1, i.e. they are formed in the direction of the width of the slider. The traces of processing 3*l*–3*n* may have a triangle in cross section as shown in FIG. 2 or a rectangular shape in cross section as shown in FIG. 3. In the planar structure of the air bearing surfaces 11, 12, each of the bearing surfaces has a convex surface which is Controlled by the traces of processing 3*l*–3*n*. The magnetically transducing element 2 is attached to the slider 1 at an end side in the longitudinal direction of the slider 1 which corresponds to the air flowing direction a.

The slider 1 is of a 2-rail type wherein two rails 14, 15 are formed in the medium opposing surface so that the surfaces of the rails 14, 15 are utilized as the air bearing surfaces 11, 12. The slider 1 may have more than two rails. The slider 1 may be of a ceramics structure such as $Al_2O_3$-TiC or ferrite.

The magnetically transducing element 2 may be a thin film magnetic transducing element. In this embodiment, there is shown a thin film magnetic head. Numerals 21, 22 designate taking electrodes. The thin film magnetic transducing element 2 may be of an induction type or a magneto-resistance effect type. The induction type thin film magnetic transducing element 2 includes an in-plane recording/ reproducing element and a vertical recording reproducing element. A Winchester type magnetic head or a composite type magnetic head may be used in the present invention instead of the thin film magnetic head.

As described above, since the slider 1 has traces of processing 3*l*–3*n* in the groove 13 in the medium opposing surface excluding the air bearing surfaces 11, 12, there takes place a difference of strain by processing between a portion where the traces of processing 3*l*–3*n* are formed and a portion where there is no traces of processing 3*l*–3*n*. Since the traces of processing 3*l*–3*n* are arranged on linear lines imaginarily drawn in the bottom surface of the groove 13, there takes place a strain by processing so that the slider 1 is flexed at both sides of the linear lines on which the traces of processing 3*l*–3*n* are formed. By the strain of processing, the flatness of each of the air bearing surfaces 11, 12 of the slider 1 can be controlled. The planar structure of the air bearing surfaces 11, 12 can be controlled by suitably selecting the shape, the direction, the number, the position, the depth, and the width of the traces of processing 3*l*–3*n* even though the air bearing surfaces 11, 12 have a convex surface or a concave surface. The controlling of the flatness of the air bearing surfaces by means of the traces of processing 3*l*–3*n* can be extremely easy in comparison with a case of controlling the flatness of the air bearing surfaces 11, 12 by means of directly grinding. Further, the planar structure can be easily controlled in a small area in the order of nm. Further, since the shape, the direction, the number, the position, the depth, and the width of the traces of processing 3*l*–3*n* don't change with time, there is no change of the planar structure of the air bearing surfaces 11, 12.

In the embodiment shown in FIGS. 1 and 2, the air bearing surfaces 11, 12 and the groove 13 are formed along the longitudinal direction of the slider, and the traces of processing 3*l*–3*n* are formed in the direction perpendicular to the longitudinal direction of the slider 1. Accordingly, the planar structure of the air bearing surfaces 11, 12 is controlled so as to have a convex surface along the longitudinal direction of the slider 1 due to a strain of processing F1 which is resulted from the traces of processing 3*l*–3*n*.

Figure 4:
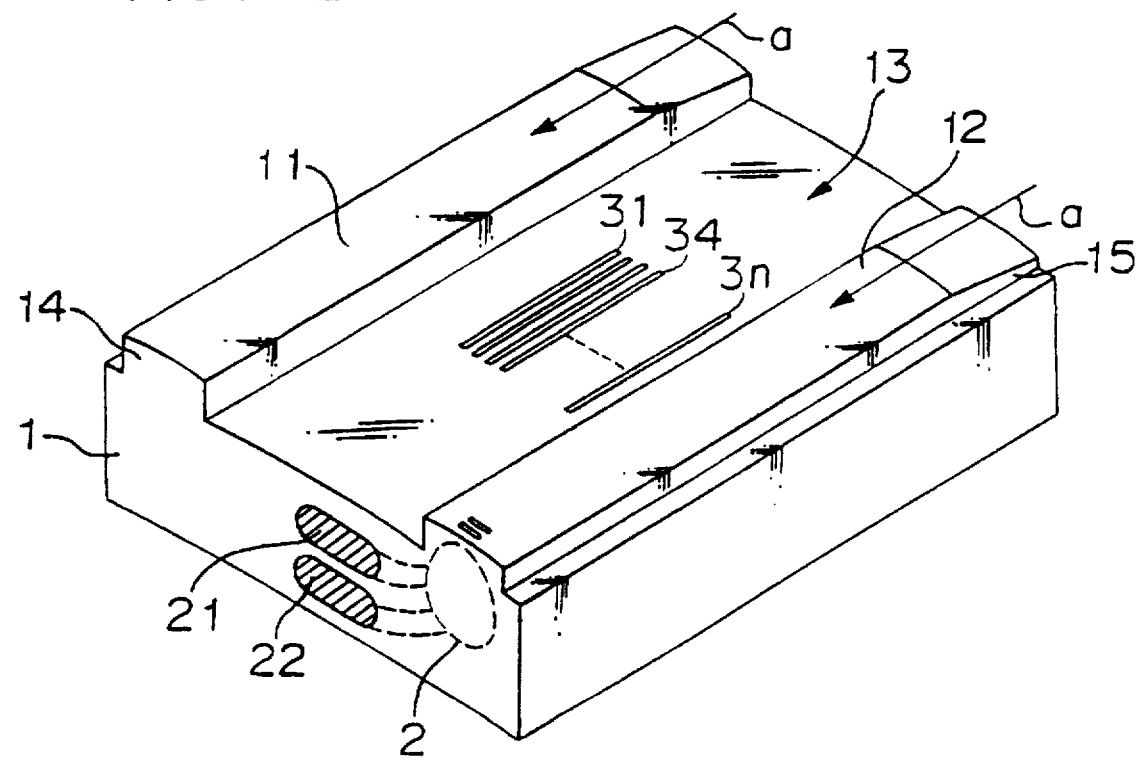
FIG. 4 is a perspective view of another embodiment of the magnetic head according to the present invention.

FIG. 4 is a perspective view showing another embodiment of the magnetic head according to the present invention. In FIG. 4, the same reference numerals designate the same or corresponding parts. The traces of processing 3*l*–3*n* are formed along the longitudinal direction of the slider 1. By a strain induced by the traces of processing 3*l*–3*n*, the air bearing surfaces 11, 12 are controlled so as to become a convex surface along the width direction of the slider unlike the case of FIGS. 1 through 3.

Figure 5:
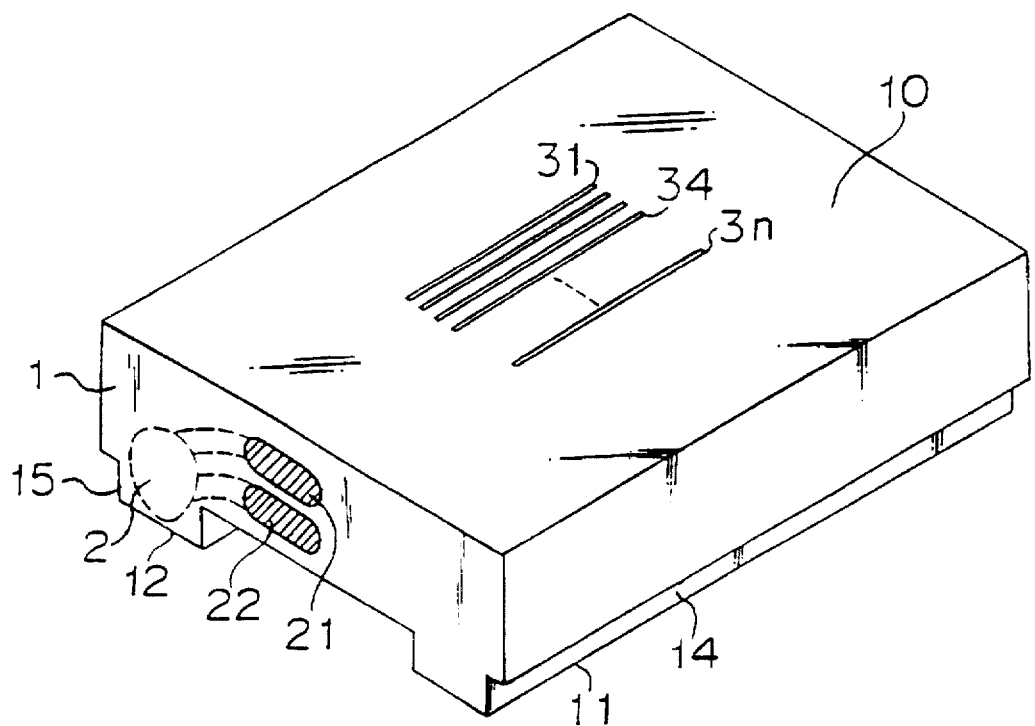
FIG. 5 is a perspective view of still another embodiment of the magnetic head of the present invention.

FIG. 5 shows another embodiment of the magnetic head of the present invention, wherein the traces of processing 3*l*–3*n* are formed in the opposite surface 10 which is at the opposite side of the medium opposing surface of the slider.

If the traces of processing 3*l*–3*n* are formed only in the opposite surface 10 and they are not formed in the medium opposing surface of the slider, the air bearing surfaces 11, 12 are controlled to become a concave surface.

When the traces of processing 3*l*–3*n* are formed in the medium opposing surface in addition to the opposite surface 10, the planar structure of the air bearing surfaces 11, 12 is controlled by the synthetic effect of convex surface formation by the traces of processing (not shown) formed in the medium opposing surface and concave surface formation by the traces of processing 3*l*–3*n* formed in the opposite surface 10. Traces of processing 3*l*–3*n* in the opposite surface 10 can be utilized as a way of correction in a case that, for instance, there is formed excessively a convex surface by the traces of processing in the medium opposing surface.

The traces of processing 3*l*–3*n* may be formed in the width direction of the slider.

Figure 6:
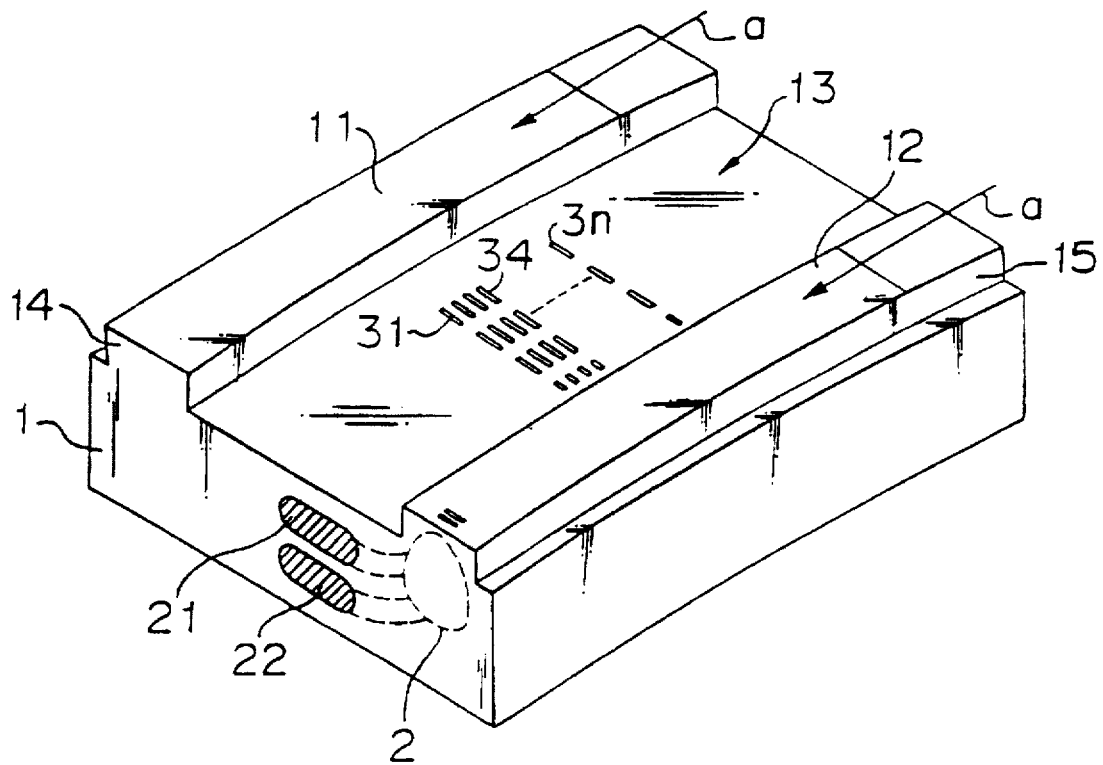
FIG. 6 is a perspective view of still another embodiment of the magnetic head of the present invention.

FIG. 6 is a perspective view showing a still another embodiment of the magnetic head according to the present invention. In this embodiment, each of the traces of processing 3*l*–3*n* is formed in a discrete manner.

Figure 7:
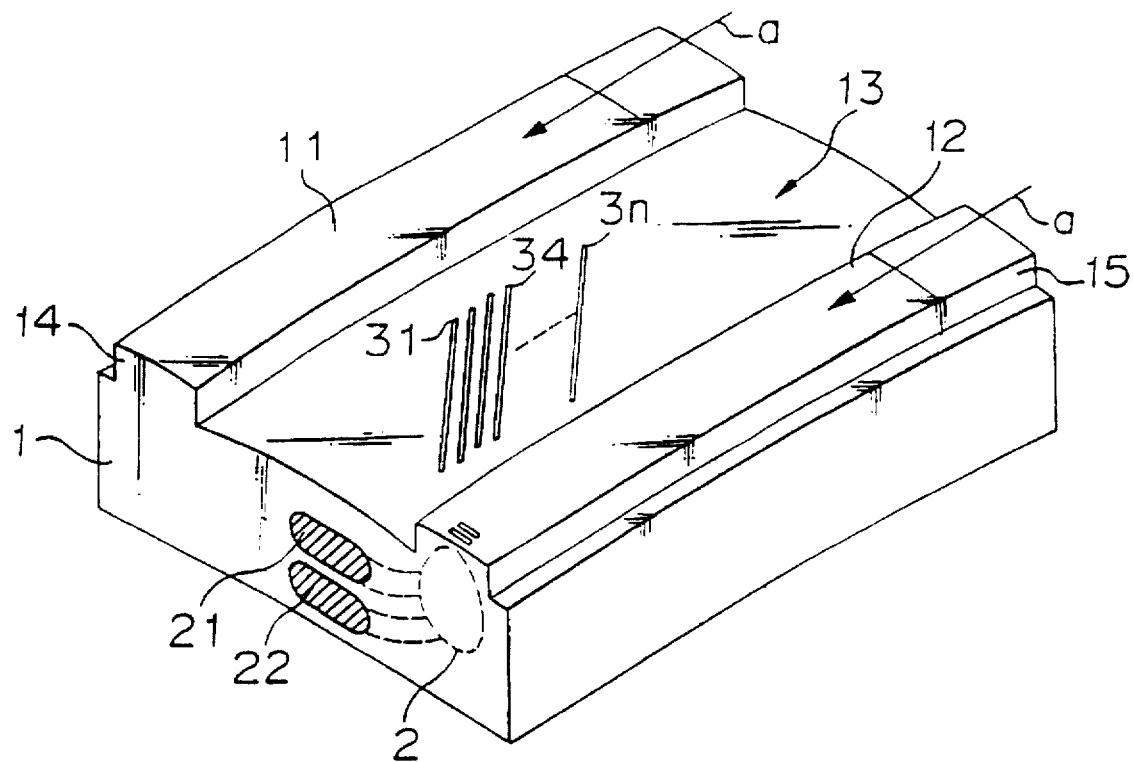
FIG. 7 is a perspective view of a still another embodiment of the magnetic head of the present invention.

FIG. 7 is a perspective view showing a still another embodiment of the magnetic head according to the present invention. The traces of processing 3*l*–3*n* are respectively formed obliquely with respect to the longitudinal and width directions of the slider.

In a modification, another group of traces of processing may be formed so as to cross the traces of processing 3*l*–3*n*.

Figure 8:
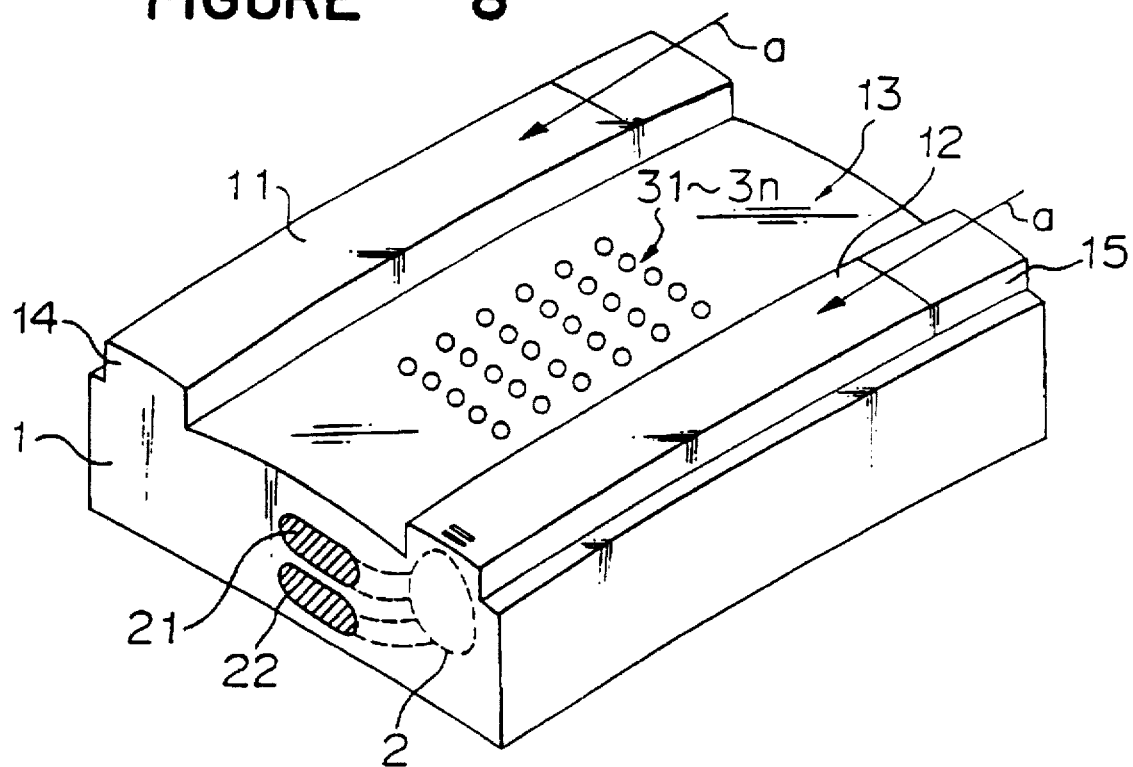
FIG. 8 is a perspective view of a still another embodiment of the magnetic head of the present invention.

FIG. 8 is a perspective view showing a still another embodiment of the magnetic head according to the present invention. The traces of processing 3*l*–3*n* show a spot-like distribution so as to entirely cover a certain plane area.

It is possible to suitably combine above-mentioned arrangements of the traces of processing 3*l*–3*n* although Figures are omitted. With such combination, the planar structure of the air bearing surface 11, 12 can be controlled as desired.

The traces of processing 3*l*–3*n* can be formed by machining the slider with use of a cutter or a needle-like tool made of diamond, ceramics or carbide, or by irradiating laser, electron rays, ion beams or ultrasonic waves to a desired portion of the slider or by injecting fine abrasive particles to the slider. With use of such processing traces forming means, the shape, the direction, the number, the position, the depth and the width of the traces of processing 3*l*–3*n* can be selected as desired. The processing operations are extremely easy, while it is possible to obtain a precise operation in the order of nm, in comparison with a case that the air bearing surfaces 11, 12 are directly ground to control the planar structure of the bearing surfaces.

Figure 9:
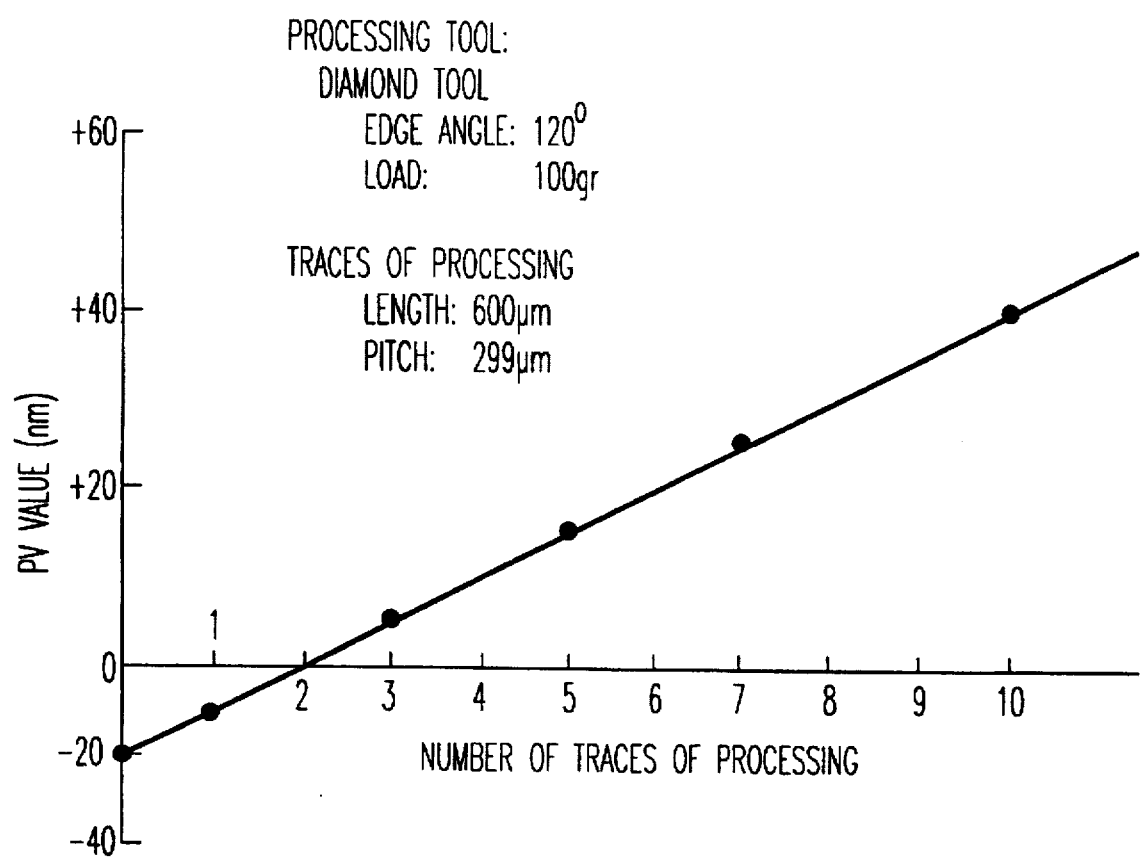
FIG. 9 is a diagram showing a relation of the number of traces of processing to the planar structure of an air bearing surface.
Figure 10:
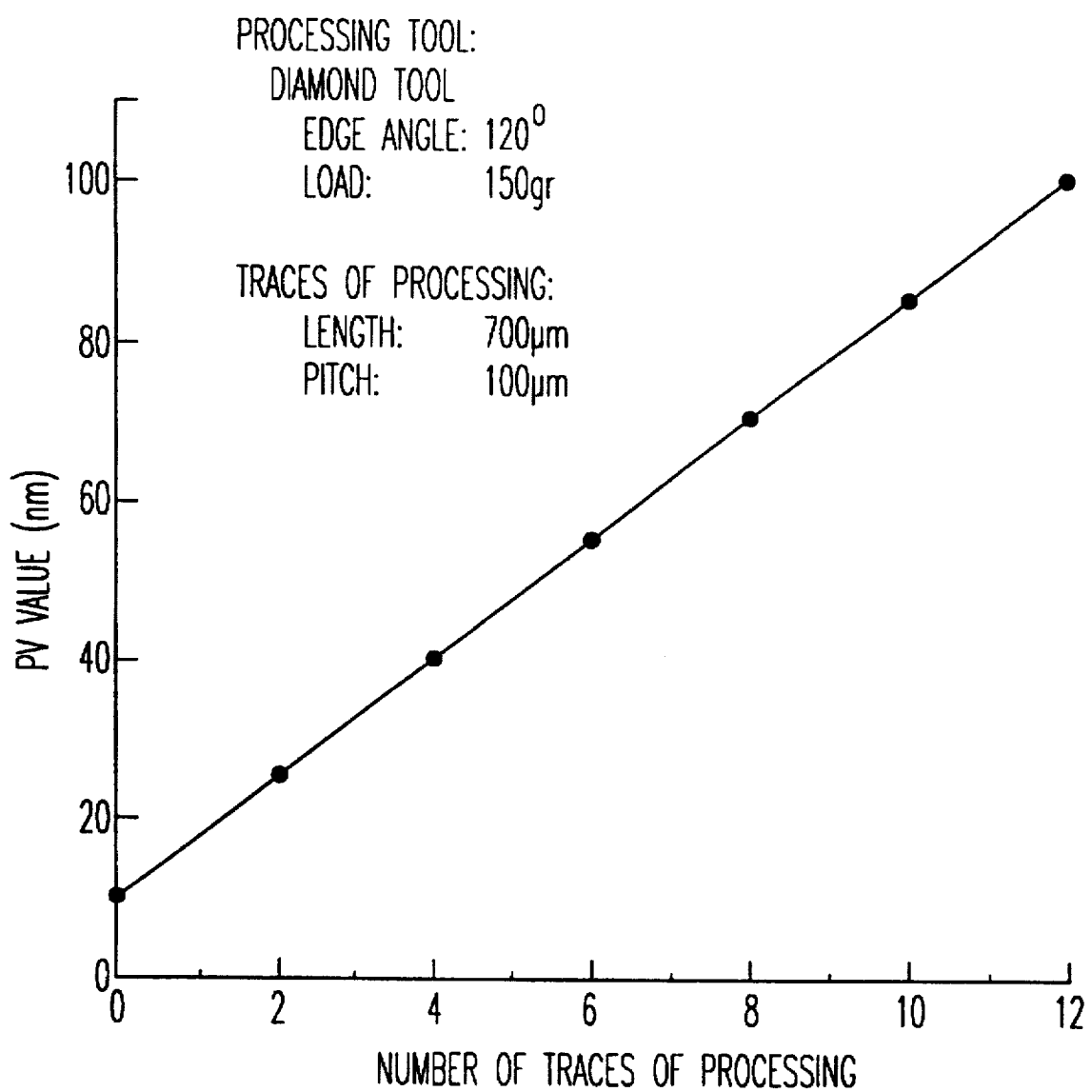
FIG. 10 is a diagram showing a relation of the number of traces of processing to a planar structure of an air bearing surface.

FIGS. 9 and 10 are respectively observed data showing relations of the number of traces of processing to degrees of controlling the planar structure of the air bearing surfaces wherein the abscissa represents the number of traces of processing and the ordinate represents PV values (nm) measured to the air bearing surfaces. These data were obtained by using the magnetic head shown in FIGS. 1 through 3.

FIG. 9 shows data obtained by forming traces of processing having a length of 600 μm and a pitch of 200 μm with use of a diamond tool having an edge angle of 120° to which a load of 100 gr is applied. FIG. 10 shows data obtained by forming traces of processing having a length of 700 μm and a pitch of 100 μm with use of a diamond tool having an edge angle of 120° to which a load of 150 gr is applied.

It is found from the data that the PV value can be controlled depending on the depth and the width of the traces of processing (which is relied on a load) the number, the length and the pitch of the traces of processing.

In accordance with the present invention, the following advantages can be obtained.

(a) The slider is provided with traces of processing on at least one between the medium opposing surface excluding the air bearing surfaces and the surface which is opposite the medium opposing surface, the traces of opposing being formed on linear lines imaginarily drawn on such surface or surfaces. Accordingly, there can be provided a magnetic head capable of controlling the flatness of the air bearing surfaces of the slider by utilizing a difference of strain caused between a portion having the traces of processing and a portion without traces of processing.

(b) There can be provided a magnetic head which is highly flexible in selecting the planar structure of the air bearing surfaces, namely, the air bearing surfaces having a convex surface or a concave surface can be obtained by suitably selecting the direction, the number, the position, the depth, the width and the shape of the traces of processing.

(c) There can be provided a magnetic head which can easily control the planar structure of the air bearing surfaces in comparison with a case that the air bearing surfaces are directly ground, and which can easily control the planar structure of the air bearing surfaces in a small area range in the order of nm.

(d) Since the direction, the number, the position, the depth and the width of the traces of processing are not changed with a lapse of time, there can be provided a magnetic head free from a change in the planar structure of the air bearing surfaces due to change with time.

(e) Since the traces of processing are formed by mechanically processing the slider with use of a cutter or a needle-like tool made of diamond, ceramics or carbide, or by irradiating laser, electronic rays, ion beams or ultrasonic waves to a necessary portion of the slider, or by injecting fine abrasive particles to the slider, there can be provided a method of manufacturing a magnetic head which allows to select the number, the position, the depth, the width and the shape of the traces of processing, can easily process the slider in comparison with a case that the air bearing surfaces of the slider are directly ground to control the planar structure, and can control processing as precise as a small area range in the order of nm.

We claim:

1. A method of controlling the degree of flatness of an air bearing surface in a medium opposing surface of a slider for a magnetic head, said slider also having a surface remote from the medium opposing surface, comprising inducing a strain in said air bearing surface by forming at least one trace of processing in at least one of (1) the surface remote from the medium opposing surface and (2) the medium opposing surface excluding the air bearing surface of the slider.

2. The method of claim 1, wherein the at least one trace of processing is formed by machining the slider with a cutter or needle tool made of diamond, ceramics, or a carbide material.

3. The method of claim 1, wherein the at least one trace of processing is formed by applying laser, electron rays, ion beams or ultrasonic waves to the slider.

4. The method of claim 1, wherein the at least one trace of processing is formed by injecting fine abrasive particles.

* * * * *